United States Patent [19]

Zucker

[11] Patent Number: 4,888,476
[45] Date of Patent: Dec. 19, 1989

[54] OPTICAL SCANNING SYSTEM FOR FOCUSSING A COMPACT-DISK PLAYER

[75] Inventor: Friedhelm Zucker, Villingen-Schwenningen, Fed. Rep. of Germany

[73] Assignee: Deutsche Thomson-Brandt GmbH, VS-Villingen, Fed. Rep. of Germany

[21] Appl. No.: 222,921

[22] PCT Filed: Oct. 21, 1987

[86] PCT No.: PCT/EP87/00620
§ 371 Date: Jun. 20, 1988
§ 102(e) Date: Jun. 20, 1988

[87] PCT Pub. No.: WO88/03309
PCT Pub. Date: May 5, 1988

[30] Foreign Application Priority Data

Oct. 22, 1986 [DE] Fed. Rep. of Germany ....... 3635840

[51] Int. Cl.$^4$ ............................ G02B 7/11; G11B 7/09
[52] U.S. Cl. ........................................ 250/201; 369/45
[58] Field of Search ................... 250/201; 369/44, 45, 369/46

[56] References Cited

U.S. PATENT DOCUMENTS

| | | | |
|---|---|---|---|
| 4,423,495 | 12/1983 | Musha et al. | 369/45 |
| 4,742,219 | 5/1988 | Ando | 250/201 |
| 4,823,330 | 4/1989 | Arter et al. | 250/201 |

Primary Examiner—Edward P. Westin
Attorney, Agent, or Firm—Max Fogiel

[57] ABSTRACT

An arrangement for adjusting a radiation detector in a scanning system that scans a surface, in which the surface reflects rays emitted by a radiation source. The reflected rays are focused onto a radiation detector by at least one focusing element. The radiation detector has at least two individual detectors. A summation signal and at least one difference signal is constructed from output signals of the detectors. The radiation detector is adjusted perpendicular to the optical axis of the system by oscillating selectively one of the source of radiation, the focusing element, or the surface so that a focal point arrives in front of the radiation detector when the oscillating focusing element, oscillating source of radiation, or oscillating surface is displaced by a maximum in one direction. The focal point, on the other hand, arrives behind the radiation detector when the focusing element, source of radiation, or surface is displaced by a maximum in another direction. The value of the difference signal is stored when the summation signal is at a maximum.

8 Claims, 2 Drawing Sheets

OPTICAL SCANNING SYSTEM FOR FOCUSSING A COMPACT-DISK PLAYER

The invention concerns a scanning system that scans a surface with rays, wherein rays emitted by a source of radiation are reflected by the surface being scanned and focused by one or more focusing elements onto a radiation detector comprised of at least two individual detectors, from the output signals of which a summation signal and at least one difference signal are constructed.

Optical scanning systems of this type, which are often called "optical pick-ups", are employed for example with compact-disk players to pick up the information stored on the disk. The usual source of radiation is a laser diode, the focusing elements are lenses, and the radiation detector is a photodetector.

The structure and function of an optical scanning system for a compact-disk player are described on pp. 209 to 215 of Electronic Components & Applications, Vol. 6, No. 4 (1984). In addition to the example described in that source, there are also other scanning systems, all of which, however, are similar in design and operate in accordance with similar principles.

FIG. 2a on page 213 of the aforesaid reference represents the path of the rays in an optical scanning system. The rays emitted by a laser diode are focused on the mirror surface of a compact disk through a prismatic ray divider, a collimator lens, and an objective lens. The rays are then reflected back to the prismatic ray divider through the objective lens and the collimator lens. The prismatic ray divider, in the capacity of a deflection unit, reflects the rays reflected from the compact disk through a cylindrical lens onto the photodetector at a right angle. The photodetector consists of four equally large square elements A, B, C, and D arrayed in a square. When the ray of light is precisely focused on the compact disk, the ray reflected from the compact disk creates a circle on the photodetector, in which case the difference signal $(A+C)-(B+D)$ constructed from the four output signals from elements A, B, C, and D is zero and the summation signal assumes a maximum because all the light reflected from the compact disk strikes the photodetector. When the focus is slightly off, difference signal $(A+C)-(B+D)$ assumes a value other than zero because the spot of light on the photodetector deviates from the circular and becomes an ellipse due to the astigmatic action of the cylindrical lens. From difference signal $(A+C)-(B+D)$, which is often called a "focusing-error" signal, the focus-control loop detects whether the focal point is above or below the mirror surface of the compact disk.

The focus-control loop shifts the objective lens toward the optical axis to ensure that the focal point will always be at the mirror surface of the disk. Prerequisite of course to this fine-control process, which occurs in the micrometer range, is an equally fine adjustment of the photodetector with respect to its distance from both the prismatic ray divider and the optical axis.

The procedure for centering the photodetector on the optical axis will now be described. A semitransparent mirror is employed instead of the compact disk. A videocamera with a microscope is positioned behind the mirror. A focal point is precisely established on the semitransparent mirror. The focus is checked with the microscope and videocamera. The photodetector cannot be adjusted within the plane perpendicular to the optical axis until the focus on the surface of the mirror is precise. It will be positioned precisely at the center when difference signals $(A+C)-(B+D)$ and $(A+D)-(B+C)$ are zero and the summation signal is at a maximum, because all the light reflected from the semitransparent mirror will be striking it.

Whoever is adjusting the photodetector must then shift it along the plane perpendicular to the optical axis until the difference signal becomes zero. The photodetector will then be correctly positioned and can be screwed into place. This method of adjustment demands a lot of time and sensitive fingers. It is possible to displace the objective lens unintentionally during the process, in which case the focal point will have to be reestablished on the surface of the semitransparent mirror, and any displacement of the lens, even in the micrometer range, will itself necessitate readjustment. It will accordingly be evident how much patience and what sensitive fingers the operator carrying out the adjustment must have.

SUMMARY OF THE INVENTION

The object of the invention is accordingly to improve a scanning system that employs rays, especially an optical scanning system for a compact-disk player, to the extent that adjusting the radiation detector is considerably simplified.

This object is attained in accordance with the invention in that the radiation detector is adjusted perpendicular to the optical axis by oscillating either one of the focusing elements, the source of radiation, or the surface that is being scanned about a center thereof in such a way that the focal point will arrive in front of the radiation detector when the oscillating focusing element, the oscillating source of radiation, or the surface is maximally displaced in one direction and behind the radiation detector when the element, source, or surface is maximally displaced in the other direction and in that the value assumed by the difference signals when the summation signal is at a maximum is stored.

DESCRIPTION OF THE DRAWINGS

Figure 1:
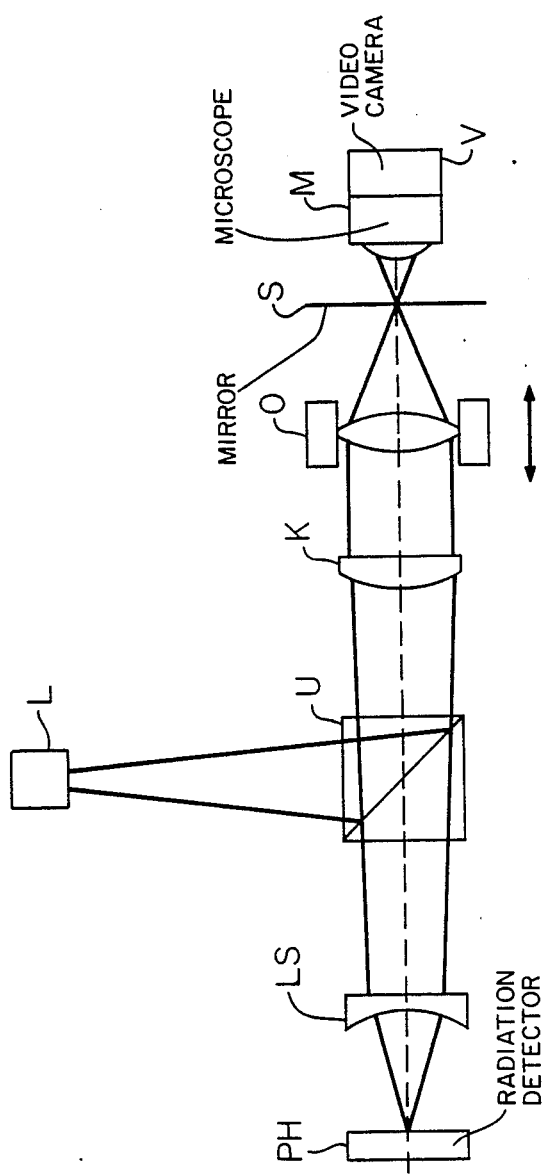
FIG. 1 illustrates an optical scanning system for a compact-disk player.

The laser diode L illustrated in FIG. 1 projects light onto a deflection unit in the form of a prismatic ray divider U that deflects the light at a right angle onto a semitransparent mirror S. Positioned in the path of the rays between prismatic ray divider U and semitransparent mirror S are a collimator lens K, and an objective lens O. Semitransparent mirror S reflects some of the light that strikes it back through objective lens O and collimator lens K to prismatic ray divider U, which allows some of the light to pass straight through onto radiation detector PH. Positioned in the path of light between radiation detector PH and prismatic ray divider U is a cylindrical lens LS. Behind semitransparent mirror S, which occupies the position occupied by the compact disk when the compact-disk player is playing, there is a microscope M and a videocamera V, which are employed as previously described herein to establish a focal point on the surface of the mirror. When the player is operating, objective lens O, which is the component that sets the focus-control loop, is advanced along the optical axis by the focus controls until the focal point arrives on the mirror surface of the compact disk. Objective lens O is then secured in position by springs, which are not illustrated in FIG. 1, in such a way that it can be shifted around a central point toward the optical axis. A magnetic coil, which is also not illustrated, shifts, in accordance with the strength of its field, objective lens O in precise increments toward the optical axis.

Figure 2:
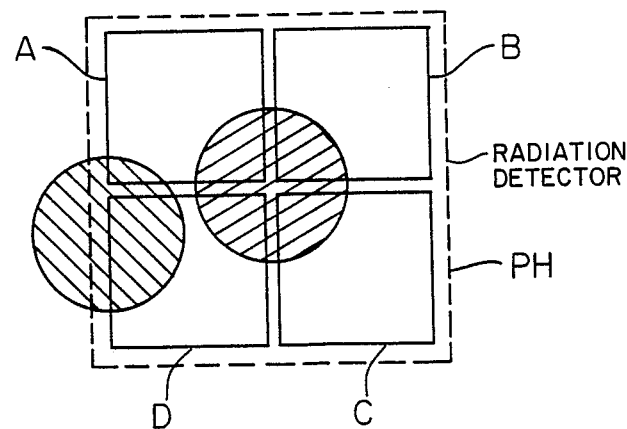
FIG. 2 illustrates a photodetector, showing the positions of the circular focal point when the photodetector is correctly and incorrectly adjusted.

The scanning system in accordance with the invention will now be specified with reference to FIGS. 1 and 2.

Objective lens O is oscillated along the optical axis until the focal point is in front of semitransparent mirror S when the deviation is in one direction and behind it when the deviation is in the other direction. A conventional mirror or a compact disk can be employed instead of semitransparent mirror S. Photodetector PH can consist for example of four square elements A, B, C, and D of the same size that are arrayed in a larger square as illustrated in FIG. 2.

Whenever the spot of light striking photodetector PH during the oscillation of objective lens O generates a maximum summation signal $T=AS+BS+CS+DS$ obtained from the four output signals AS, BS, CS, and DS from elements A, B, C, and D, the two difference signals $X=(BS+CS)-(AS+DS)$ and $Y=-(AS+BS)-(DS+CS)$ are stored and displayed. The values of X and Y will inform whoever is carrying out the adjustment what direction photodetector PH must be shifted in perpendicular to the optical axis to correctly position it. When both difference signals X and Y are zero, the photodetector PH will be in the correct position and can be screwed tight. The adjustment process will then be complete.

Since the optical scanning system in accordance with the invention involves absolutely no adjustment of objective lens O, there is no need for a microscope or videocamera.

FIG. 2 shows the spot of light in relation to both the correct and the incorrect positions of photodetector PH. In the former case the circular spot is precisely at the center of the large square comprised of the four elements A, B, C, and D. In the latter it illuminates for example the bottom left element of photodetector PH. The shape of the spot of light, either circular or, due to the astigmatic effect of cylindrical lens LS, elliptical, is insignificant because the position of the spot on photodetector PH can be precisely determined independent of its shape from the two difference signals X and Y.

The invention is especially easy to embody in a compact-disk player because all that is necessary to oscillate objective lens O along the optical axis is to apply an alternating current to the component that adjusts the focus-control loop, which is in this case the coil that shifts the lens when the player is in operation. No design measures are necessary. A frequency of 50 Hz has been proven practical for the alternating current that is applied to the coil to make the lens oscillate.

Figure 3:
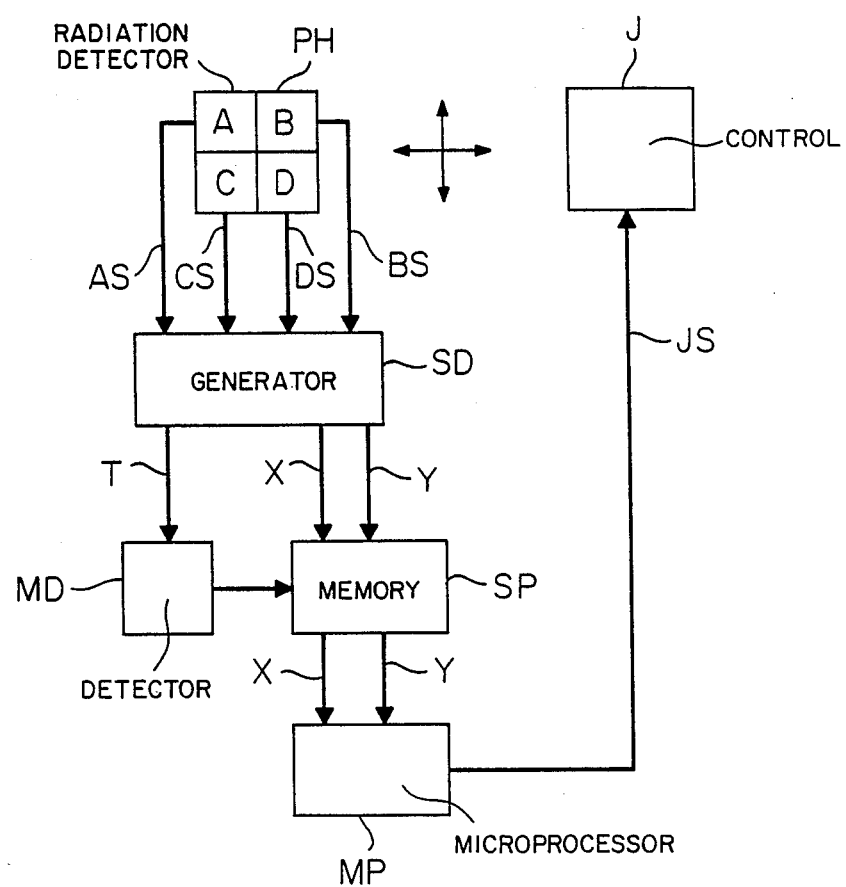
FIG. 3 illustrates another embodiment of the scanning system in accordance with the invention.

In one practical embodiment of the invention, illustrated in FIG. 3, photodetector PH is adjusted completely automatically. The output signals AS, BS, CS, and DS from the four square elements A, B, C, and D are supplied to the input terminals of a sum-and-difference generator SD that constructs summation signal $T=AS+BS+CS+DS$ and difference signals $X=(BS+CS)-(AS+DS)$ and $Y=-(AS+BS)-(DS+CS)$. The output terminals of sum-and-difference generator SD to which difference signals X and Y are applied are connected to the input terminals of a memory SP, which can for example be constructed out of two scanning and retaining stages. Summation signal T is supplied to a detector MD that detects the maxima of summation signal T and, every time a maximum occurs, ensures that difference signals X and Y are entered in memory SP. A microprocessor MP polls memory SP cyclically and computes from differences X and Y a parameter JS for controls J. The controls shift photodetector PH perpendicular to the optical axis as illustrated in FIG. 3.

The automatic adjustment functions like a control loop, with controls J shifting photodetector PH until difference signals X and Y become zero, at which point the adjustment is complete.

The scanning system in accordance with the invention is intended for but not restricted to compact-disk players. It can be embodied when the photodetector supplies several output signals, from which a summation signal and at least one difference signal are constructed. Whether the scanning system operates with rays of light or with other forms of radiation is insignificant.

I claim:

1. A scanning system with an optical axis for scanning a surface having a center location comprising: a source of radiation emitting rays onto a surface being scanned about said center location, said rays being reflected by said surface, a radiation detector having at least two individual detectors; at least one focusing element for focusing rays reflected by said surface onto said radiation detector, said individual detectors having output signals; means for constructing a summation signal and at least one difference signal from said output signals; means for adjusting said radiation detector perpendicular to said optical axis by ascillating selectively one of said source of radiation, said focusing element, or said surface so that a focal point arrives in front of said radiation detector when the oscillating focusing element, oscillating source of radiation, or oscillating surface is displaced by a maximum in one direction, said focal point arriving behind said radiation detector when said focusing element, source of radiation, or surface is displaced by a maximum in another direction; and means for storing the value of said difference signal when said summation signal is at a maximum.

2. A scanning system as defined in claim 1, including means for displaying said value of said difference signal when said summation signal is at a maximum.

3. A scanning system as defined in claim 1, including a microprocessor for computing from said difference signal a control parameter to adjust said radiation detector.

4. A scanning system as defined in claim 3, including a sum-and-difference generator receiving said output signals from said radiation detectors; a maximum detector for detecting maxima of said summation signal and entering said difference signal into said storage means every time a maximum of said summation signal occurs, said microprocessor interrogating said storage means cyclically.

5. A scanning system as defined in claim 1, wherein said source of radiation comprises a source of light; said radiation detector comprising a photodetector; said focusing element comprising lens means.

6. A scanning system as defined in claim 5, including a prismatic ray detector for reflecting rays emitted by said source of light at a right angle; a collimator lens and an objective lens transmitting rectangularly reflected rays for striking said surface; rays reflected by said surface being aimed at said photodetector by said objective lens, said collimator lens, said prismatic ray divider, and a cylindrical lens.

7. A scanning system as defined in claim 6, wherein said objective lens oscillates along said optical axis.

8. A method of adjusting a radiation detector in a scanning system with an optical axis for scanning a surface having a center location, comprising the steps: reflecting rays emitted by a source of radiation from said surface; focusing the reflected rays onto a radiation detector by at least one focusing element, said radiation detector having at least two individual detectors with output signals; constructing a summation signal and at least one difference signal from said output signals; adjusting said radiation detector perpendicular to said optical axis by oscillating selectively one of said source of radiation, said focusing element, or said surface so that a focal point arrives in front of said radiation detector when the oscillating focusing element, oscillating source of radiation, or oscillating surface is displaced by a maximum in one direction, said focal point arriving behind said radiation detector when said focusing element, source of radiation, or surface is displaced by a maximum in another direction; and storing the value of said difference signal when said summation signal is at a maximum.

* * * * *